United States Patent
Rutherford

[11] Patent Number: 5,900,265
[45] Date of Patent: May 4, 1999

[54] APPARATUS AND METHOD FOR INSERTING A FILLING INTO A FOOD PRODUCT

[76] Inventor: Kenneth Rutherford, 2163 47th St., Los Alamos, N.M. 87544

[21] Appl. No.: 08/865,365

[22] Filed: May 29, 1997

[51] Int. Cl.⁶ .................................................. A21C 15/00
[52] U.S. Cl. .......................... 426/281; 426/94; 426/282; 426/283; 426/391; 426/497; 99/450.7; 99/450.8; 239/601; 141/392
[58] Field of Search ..................................... 426/281, 282, 426/283, 94, 391, 496, 497, 499; 99/450.6, 450.7, 450.8; 259/601; 141/392

[56] References Cited

U.S. PATENT DOCUMENTS

| | | | |
|---|---|---|---|
| 3,452,687 | 7/1969 | Kaneko et al. | 426/283 X |
| 3,465,693 | 9/1969 | Lopata | 426/281 |
| 3,556,809 | 1/1971 | Strandine et al. | 426/281 |
| 3,682,087 | 8/1972 | Panek | 426/281 X |
| 3,804,954 | 4/1974 | Clardy | 426/281 |
| 3,946,117 | 3/1976 | Blair et al. | 427/291 |
| 4,669,967 | 6/1987 | Hayashi et al. | 99/450.8 X |
| 4,703,688 | 11/1987 | Ochs | 99/450.8 |
| 4,752,488 | 6/1988 | Hayashi et al. | 426/281 |
| 4,963,377 | 10/1990 | Rimmeir | 426/283 |
| 5,641,527 | 6/1997 | Burger | 426/94 |
| 5,654,021 | 8/1997 | Burger | 426/94 |
| 5,807,599 | 9/1998 | Weisberger et al. | 426/282 X |

*Primary Examiner*—Milton Cano
*Attorney, Agent, or Firm*—Milton D. Wyrick

[57] ABSTRACT

Apparatus and method for inserting fillings into foods such as bagels, donuts, other pastries and confectioneries. A base supports a movable platform onto which a restraining device are mounted for fixing a food to be filled in a fixed position. Coiled tubing is provided for insertion into the food and for conveying a filling material into the food. Coiled tubing may be inserted by holding coiled tubing in fixed position and rotating the food. Alternatively, the food can be held in a fixed position and the coiled tubing rotated into the food.

9 Claims, 2 Drawing Sheets

APPARATUS AND METHOD FOR INSERTING A FILLING INTO A FOOD PRODUCT

The present invention generally relates to the culinary arts, and, more specifically to devices which fill the interior of foods, such as breads, confections and pastries with creams, jellies, vegetables, cooked meats, fish, and the like.

BACKGROUND OF THE INVENTION

For decades, to the delight of both children and adults, bakers have been adding fillings to such pastries as eclairs and creme puffs. The tools with which bakers have added these fillings have ranged from simple non-porous bags which are squeezed to force viscous fluids into cavities in pastries, to more elaborate devices using valves, pistons and nozzles. The result of the baker's work has been tasty foods having a delightfully sweet filling. However, because of their design, most prior art devices have been useful only for foods having a particular shape or length.

Most prior art devices also are limited by their inability to allow determination of whether complete filling of a food product has occurred. Most do not allow monitoring of the purity of the filling, possibly allowing foreign matter into the food, or fouling the insertion of the filling. Finally, prior art devices generally have had straight insertion nozzles, limiting their use to items having generally elongated shapes.

For this reason, foods which have been filled generally have been elongate or solid, since an elongate filler is only effective for these shapes. Foods such as donuts and bagels are not normally filled because of the limitations imposed by elongate nozzles.

It is therefore an object of the present invention to provide apparatus for filling food having a coiled nozzle for insertion into food.

It is another object of the present invention to provide apparatus for filling food having a nozzle which can have various cross-sectional shapes;

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, there is provided apparatus for filling foods comprising a base with means for releasably restraining the food, the means for releasably restraining said food being rotatably attached to the base. Generally coiled tubing defines a cross-sectional shape for filling the food, together with means for delivering a filling to said generally coiled tubing.

BRIEF DESCRIPTION OF THE DRAWING

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus for the tilling of foods, including round foods such as bagels, donuts and round shaped breads and confectioneries. The invention accomplishes this through use of generally coiled nozzle for delivering filling to the food. The invention can be understood most easily through reference to the drawings.

Figure 1:
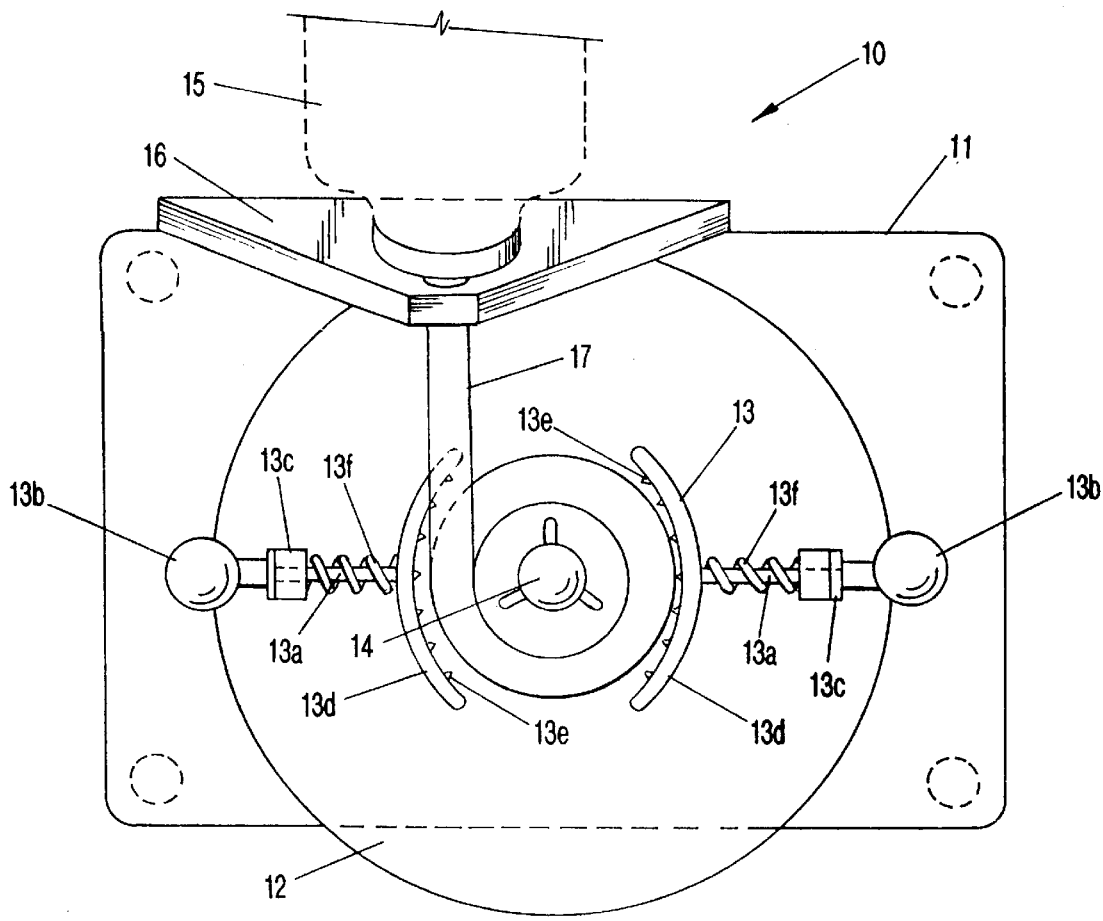
FIG. 1 is a top view of one embodiment of the present invention showing the components of the food filling apparatus.

In FIG. 1, there can be seen a top view of food filler 10. As illustrated, food filler 10 is comprised of base 11 with movable platform 12 onto which food restrainer 13 is mounted. Food restrainer 13 includes shafts 13a which are terminated in handles 13b. Shafts 13a pass through brackets 13c and connect to arcuate food holders 13d. Arcuate food holders 13d may have teeth 13e as shown, or may be smooth. Springs 13f extend between brackets 13c and arcuate food holders 13d to maintain releasable pressure against arcuate food holders 13d to facilitate the restraining of food. Connecting nut 14 connects movable platform 12 a rotary mechanism (not shown) which is clearly shown in figures which follow.

Filling container 15 is shown connected to bracket 16. Coiled tubing 17 is connected to filling container 15 in a manner which will allow filling material to flow from filling container 15 through coiled tubing 17. It the fact that coiled tubing 17 forms a coil, which can be a spiral coil, which allows the filling of such foods as donuts and bagels, since the rotation of movable platform 12 allows coiled tubing 17 to be forced into the food, and the food to contain a filling which follows the natural shape of the food. Alteratively, a food can be filled by fixing the food in position, and rotating coiled tubing 17 into the food.

Figure 2:
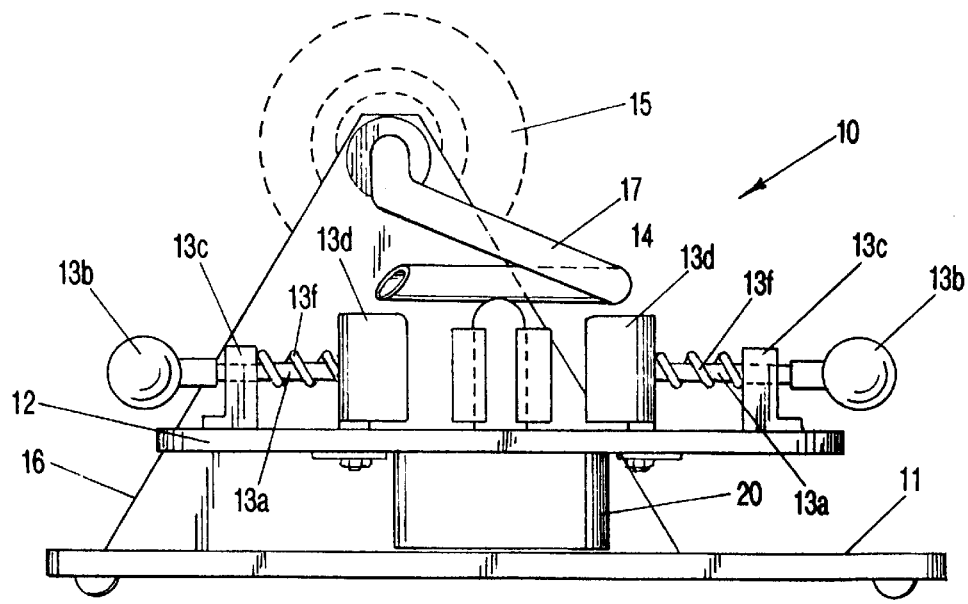
FIG. 2 is a side view of one embodiment of the present invention showing the components of the food filling apparatus.

Reference should now be made to FIG. 2, wherein a side view of food filler 10 is shown. In this view, rotary mechanism 20 is shown. Rotary mechanism 20 connects to both to movable platform 12 and to base 11. Handles 13b assist in rotating movable platform 12 so that coiled tubing 17 can be inserted into food.

Figure 3:
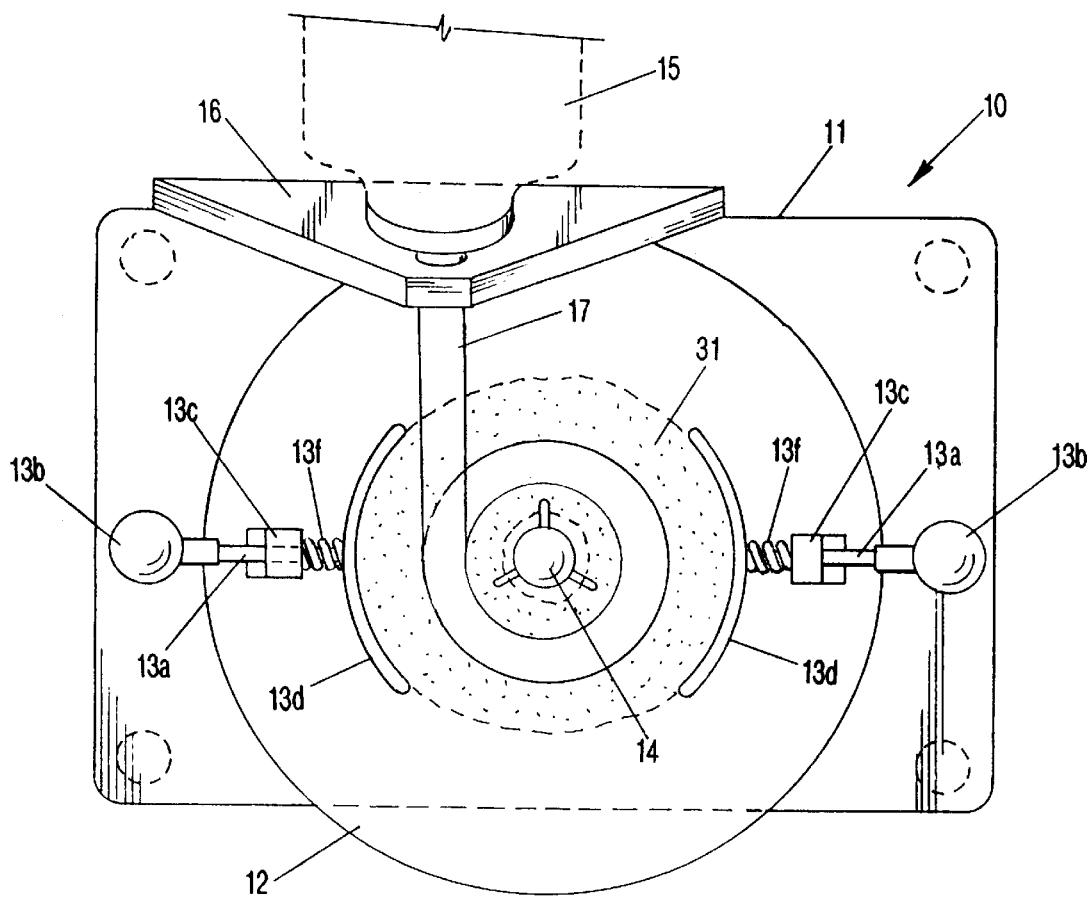
FIG. 3 is a top view of an embodiment of the present invention illustrating the coiled tubing inserted into a food product.

In FIG. 3, food 31, such as bagel or donut, is shown, held in place by arcuate food holders 13d under pressure from springs 13f. Insertion of food 31 was accomplished by using handles 13b to withdraw arcuate food holders 13d. Food 31 is inserted and handles 13b are released, restraining food 31 between arcuate food holders 13d. Filling container 15 is in place in bracket 16, with coiled tubing 17 sealably connected. It should be noted that filling container 15, although shown in the form of jar, could as well be any other type of container capable of holding and discharging a food filling.

Figure 4:
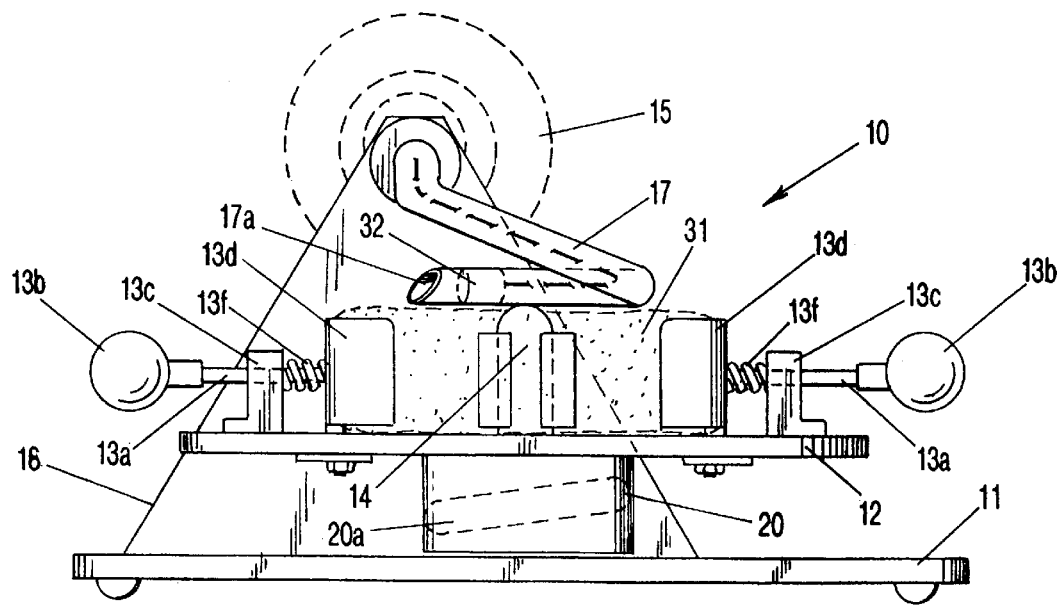
FIG. 4 is a side view of an embodiment of the invention illustrating the coiled tubing prior to being inserted into a food product, and showing in hidden lines a means for elevating the movable platform and a means for forcing a filling material into the food product.

FIG. 4 illustrates the side view of the configuration shown in FIG. 3. This view clearly exhibits the ease with which movable platform 12 can be rotated by, for example, handles 13b to insert coiled tubing 17 into food 31. To facilitate this insertion into firm foods 31, end 17a, of coiled tubing 17 can be angled as shown to form a sharp point. Coiled tubing 17 also can include flexible ram 32 which can be used during insertion of coiled tubing 17 into bagel 31 to prevent the clogging of coiled tubing 17 by the material of food 31. After insertion of coiled tubing 17 into food 31, flexible ram 32 is removed, and the filling inserted as coiled tubing 17 is slowly withdrawn, again by rotating movable platform 12.

If desired, flexible ram 32 after withdrawal from coiled tubing 17 can be used then to force filling material through coiled tubing 17 and into food 31. Alternatively, coiled tubing 17 can be filled with filing material prior to insertion into food 31. The pressurized fining material would itself prevent material of food 31 from entering coiled tubing 17.

For any one food 31 into which filling is to be inserted could have more than one filling. This could be accomplished in several ways. For one, a plurality of filings could be inserted through coiled tubing 17 through application of a manifold device acting as filling container 15 which would allow multiple filings. Also, different filings can be inserted through coiled tubing 17 sequentially. If filling integrity is important, different coiled tubings 17 can be used for each filling.

Although it may be most convenient to insert coiled tubing into food 31 by maintaining coiled tubing 17 in a stationary position, it also is possible to insert coiled tubing 17 by turning coiled tubing 17 into a stationary food 31. In the latter case, filling container 15 would be removed from bracket 16 and moved along with coiled tubing 17 if necessary. It should be clear that food filler 10 can be operated in most any position, horizontal, vertical or other convenient arrangement.

In the figures, coiled tubing 17 is illustrated as having a circular cross-section. It should be understood that coiled tubing can be constructed in any desired shape. Examples of other possible shapes are square, star shaped, and oval shaped.

Food filler 10 can be constructed of any appropriate materials. Of course, any materials that come in contact with food 31 must have been approved for such use by the National Sanitary Foundation (NSF). Examples of acceptable materials are stainless steel, plastics, and some forms of copper.

Connecting nut 4 can be any diameter to accommodate a particular food 31. Additionally, connecting nut 14 could include some form of gripping elements to assist in restraining food 31 in place during insertion of coiled tubing 17. In this manner, an appropriate connecting nut 14 can be used for different foods 31 defining a central opening. In those foods 31 not having a central opening, connecting nut 14 would lie below foods 31 near to movable platform 12.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for filling a substantially round food comprising:

a base;

means for rotating and releasably restraining a substantially round food, said means for rotating and releasably restraining said substantially round food being rotatably attached to said base;

generally coiled tubing defining a cross-sectional shape for filling said substantially round food; and means for delivering a filling to said substantially round food through said generally coiled tubing.

2. The apparatus as described in claim 1 wherein said generally coiled tubing is spirally coiled.

3. The apparatus as described in claim 1 wherein said cross-sectional shape defines a circular shape.

4. The apparatus as described in claim 1 wherein said cross-sectional shape defines a star shape.

5. The apparatus as described in claim 1 wherein said cross-sectional shape defines a square shape.

6. The apparatus as described in claim 1 wherein said cross-sectional shape defines an oval shape.

7. The apparatus as described in claim 1 wherein said cross-sectional shape defines a rectangular shape.

8. The apparatus as described in claim 1 wherein a distal end of said generally coiled tubing defines a sharp angle for easing insertion of said generally coiled tubing into said food.

9. A method of inserting a filling into a substantially round food comprising the steps of:

placing said substantially round food into a rotating and restraining means for holding said substantially food in a stationary position;

inserting a coiled tubing into said substantially round food;

forcing a filling material through said coiled tubing and into said substantially round food while rotating said rotating and restraining means; and withdrawing said coiled tubing from said substantially round food.

* * * * *